United States Patent
He et al.

(10) Patent No.: US 11,335,007 B2
(45) Date of Patent: May 17, 2022

(54) METHOD TO GENERATE NEURAL NETWORK TRAINING IMAGE ANNOTATIONS

(71) Applicant: ZEBRA TECHNOLOGIES CORPORATION, Lincolnshire, IL (US)

(72) Inventors: Duanfeng He, South Setauket, NY (US); Vincent J. Daempfle, Plainview, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 229 days.

(21) Appl. No.: 16/888,418

(22) Filed: May 29, 2020

(65) Prior Publication Data

US 2021/0374970 A1 Dec. 2, 2021

(51) Int. Cl.
*G06T 7/55* (2017.01)
*G06T 7/194* (2017.01)
*G06N 3/08* (2006.01)
*G06V 40/10* (2022.01)

(52) U.S. Cl.
CPC .............. *G06T 7/194* (2017.01); *G06N 3/08* (2013.01); *G06T 7/55* (2017.01); *G06V 40/107* (2022.01)

(58) Field of Classification Search
CPC ... G06T 7/194; G06T 7/55; G06T 7/11; G06T 7/174; G06T 2207/10024; G06T 2207/10028; G06T 2207/20081; G06T 2207/20084; G06N 3/08; G06V 40/107; G06V 10/44; G06V 10/82; G06K 9/6273
See application file for complete search history.

(56) References Cited

FOREIGN PATENT DOCUMENTS

| CN | 108073851 A | * | 5/2018 | ......... G06K 9/00389 |
|---|---|---|---|---|
| CN | 110007754 A | * | 7/2019 | ............. G06F 3/011 |
| CN | 111062263 A | * | 4/2020 | |
| CN | 111124107 A | * | 5/2020 | |

* cited by examiner

*Primary Examiner* — Matthew C Bella
*Assistant Examiner* — Kathleen M Broughton
(74) *Attorney, Agent, or Firm* — Yuri Astvatsaturov (57) ABSTRACT

A method of generating neural network training image annotations includes training a first neural network to identify and segment hands in images using a first set of 2D images with hand portions segmented in each image; substantially simultaneously capturing both a second set of 2D images, and a third set of images including depth images, depicting hands holding a particular type of object; correlating each of the second set of images with corresponding images of the third set to identify and segment foregrounds from backgrounds in the second set of images; applying the trained first neural network to the identified foregrounds to identify hand portions of the foregrounds and segment object portions from identified hand portions; and training a second neural network, using the segmented object portions of the second set of images as training data, to identify the particular type of object in new images.

8 Claims, 4 Drawing Sheets

METHOD TO GENERATE NEURAL
NETWORK TRAINING IMAGE
ANNOTATIONS

BACKGROUND

Object recognition systems are often used to identify items being purchased in retail environments. These systems typically capture an image of an item being purchased and analyze the image to identify the item. Typically, object recognition systems use machine learning techniques to train a neural network to recognize a particular type of object by feeding the neural network training data including many images of that type of object (i.e., from different angles, in different lighting, etc.).

Before providing the images to some types of neural network, such as Mask R-CNN, the target object shown in each image must be "segmented," with all pixels of the target object included in the segmentation and all pixels that are not part of the target object excluded from the segmentation. By analyzing a large number of segmented images that are known to include the target object, the neural network learns to recognize features of the object. Accordingly, the trained neural network may then be applied to a new image to identify the target object in the new image.

The process of annotating (producing the segmented image) is typically done by a human operator, who marks the edges of the target object (or the entire object) in each image. This annotation process can be tedious, time-consuming, and expensive. Consequently, annotation by a human operator can be an inefficient way of producing images to be provided to the neural network for training, especially when there are hundreds or thousands of different types of objects that the neural network must be trained to identify. Accordingly, there is a need for improved methods of annotating images to be used as training data for object identification or object verification CNNs.

SUMMARY

In an embodiment, the present invention is a computer-implemented method, comprising: accessing a first set of images, wherein each image of the first set of images is a two-dimensional image depicting a hand holding a target object, and wherein for each two-dimensional image of the first set of images, a hand portion of the two-dimensional image is segmented from the remaining portion of the two-dimensional image; training a first convolutional neural network (CNN) to identify and segment depictions of hands in digital images using the segmented hand portion of each of the first set of images; capturing, by a two-dimensional camera, a second set of images, wherein each image of the second set of images is a two-dimensional image depicting a hand holding a particular type of target object; capturing, by a depth-sensing camera, a third set of images, wherein each image of the third set of images is a depth image depicting a hand holding the particular type of target object, and wherein each depth image of the third set of images is captured substantially simultaneously as a corresponding two-dimensional image of the second set of images depicting the same hand and the same target object; correlating each two-dimensional image of the second set of images with the corresponding image of the third set of images to identify a foreground and a background of each two-dimensional image of the second set of images; segmenting, in each two-dimensional image of the second set of images, the foreground of the two-dimensional image from the background of the two-dimensional image; applying the trained first CNN to the foreground of each two-dimensional image of the second set of images to identify a hand portion of the foreground of each two-dimensional image and segment the remaining target object portion from the hand portion of the foreground of each two-dimensional image; and training a second CNN to identify the particular type of target object using the segmented remaining target object portion of the foreground of each two-dimensional image of the second set of images.

In a variation of this embodiment, the computer-implemented method further comprises: capturing a subsequent two-dimensional image by a two-dimensional camera; and applying the second CNN to the subsequent two-dimensional image to determine whether the subsequent two-dimensional image depicts the particular type of target object.

Moreover, in a variation of this embodiment, the hand portion of each two-dimensional image of the first set of images is segmented from the remaining portion of the two-dimensional image manually.

Furthermore, in a variation of this embodiment, the particular type of target object is a first type of target object, and the method further comprises: capturing, by a two-dimensional camera, a fourth set of images, wherein each image of the fourth set of images is a two-dimensional image depicting a hand holding a second type of target object; capturing, by a depth-sensing camera, a fifth set of images, wherein each image of the fifth set of images is a depth image depicting a hand holding the second type of target object, and wherein each depth image of the fifth set of images is captured substantially simultaneously as a corresponding two-dimensional image of the fourth set of images depicting the same hand and the same target object; correlating each two-dimensional image of the fourth set of images with the corresponding image of the fifth set of images to identify a foreground and a background of each two-dimensional image of the fourth set of images; segmenting, in each two-dimensional image of the fourth set of images, the foreground of the two-dimensional image from the background of the two-dimensional image; applying the trained first CNN to the foreground of each two-dimensional image of the fourth set of images to identify a hand portion of the foreground of each two-dimensional image and segment the remaining target object portion from the hand portion of the foreground of each two-dimensional image; and training a third CNN to identify the second type of target object using the segmented remaining target object portion of the foreground of each two-dimensional image of the fourth set of images.

In another embodiment, the present invention is a system, comprising: one or more two-dimensional cameras configured to capture a first set of images, wherein each image of the first set of images is a two-dimensional image depicting a hand holding a particular type of target object; one or more depth-sensing cameras configured to capture a second set images, wherein each image of the second set of images is a depth image depicting the hand holding the particular type of target object, wherein each depth image of the second set of images is captured substantially simultaneously as a corresponding two-dimensional image of the first set images depicting the same hand and the same target object; one or more processors configured to interface with the two-dimensional camera and the depth-sensing camera; and a non-transitory program memory communicatively coupled to the one or more processors and storing executable instructions that, when executed by the one or more processors, cause the processors to: correlate each two-dimensional image of the first set of images with the corresponding image of the second set of images to identify a foreground and a background of each two-dimensional image of the second set of images; segment, in each two-dimensional image of the first set of images, the foreground of the two-dimensional image from the background of the two-dimensional image; access a third set of images, wherein each image of the first set of images is a two-dimensional image depicting a hand holding a target object, and wherein for each two-dimensional image of the third set of images, a hand portion of the two-dimensional image is segmented from the remaining portion of the two-dimensional image; train a first convolutional neural network (CNN) to identify and segment depictions of hands in digital images using the segmented hand portion of each of the third set of images; apply the trained first CNN to the foreground of each two-dimensional image of the first set of images to identify a hand portion of the foreground of each two-dimensional image and segment the remaining target object portion from the hand portion of the foreground of each two-dimensional image; and train a second CNN to identify the particular type of target object using the segmented remaining target object portion of the foreground of each two-dimensional image of the first set of images.

In a variation of this embodiment, the one or more two-dimensional cameras are configured to capture a subsequent two-dimensional image, and the executable instructions, when executed by the one or more processors, cause the processors to: apply the second CNN to the subsequent two-dimensional image to determine whether the two-dimensional image depicts the particular type of target object.

Moreover, in a variation of this embodiment, the hand portion of each two-dimensional image of the third set of images is segmented from the remaining portion of the two-dimensional image manually.

Furthermore, in a variation of this embodiment, the particular type of target object is a first type of target object, the one or more two-dimensional cameras are further configured to capture a fourth set of images, each image of the fourth set of images is a two-dimensional image depicting a hand holding a second type of target object; the one or more depth-sensing cameras are further configured to capture a fifth set of images, each image of the fifth set of images is a depth image depicting a hand holding the second type of target object, and each depth image of the fifth set of images is captured substantially simultaneously as a corresponding two-dimensional image of the fourth set of images depicting the same hand and the same target object; and the executable instructions, when executed by the one or more processors, cause the processors to: correlate each two-dimensional image of the fourth set of images with the corresponding image of the fifth set of images to identify a foreground and a background of each two-dimensional image of the fourth set of images; segment, in each two-dimensional image of the fourth set of images, the foreground of the two-dimensional image from the background of the two-dimensional image; apply the trained first CNN to the foreground of each two-dimensional image of the fourth set of images to identify a hand portion of the foreground of each two-dimensional image and segment the remaining target object portion from the hand portion of the foreground of each two-dimensional image; and train a third CNN to identify the particular type of target object using the segmented remaining target object portion of the foreground of each two-dimensional image of the fourth set of images.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides techniques to produce annotated images to be used in training a neural network to identify an item being purchased based on an image of the item being purchased. Advantageously, using the techniques of the present disclosure, the neural network is trained using minimal human-operated annotation, greatly reducing the inefficiency and the potential for errors in the training process. Moreover, using the techniques of the present disclosure, annotated images may be produced for the purpose of training the neural network to identify or verify the item being purchased even if the item being purchased is partially obscured by a human hand or other additional item in the image.

Figure 1:
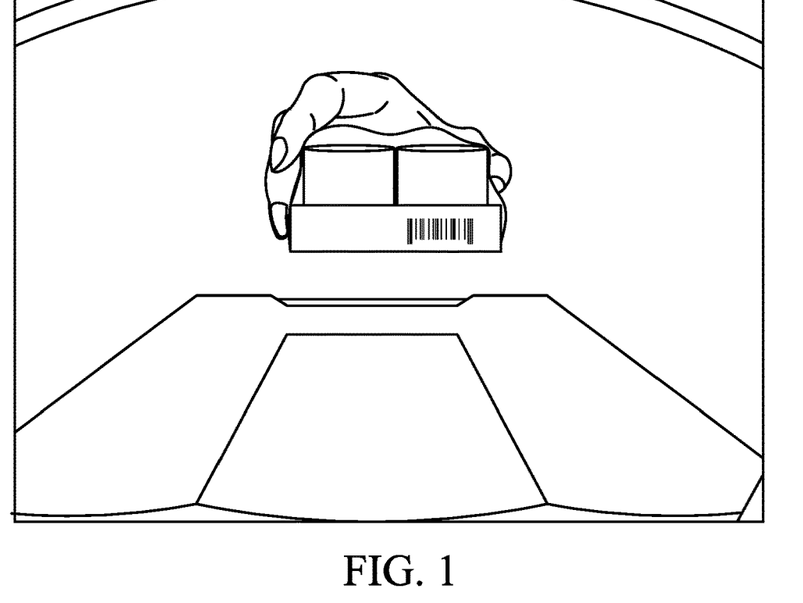
FIG. 1 illustrates an example of a captured two-dimensional image including a human hand holding an item.
Figure 2:
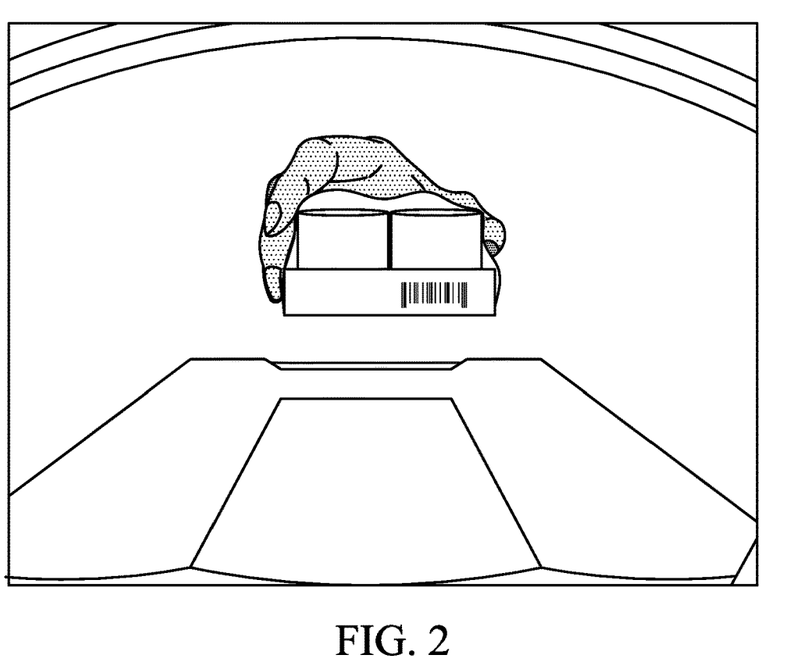
FIG. 2 illustrates an example of a two-dimensional image including a human hand holding an item, in which the human hand has been segmented from other objects in the image.

In particular, in an embodiment of the present disclosure, human-operated annotation may be used only for training an initial neural network (also called a "first neural network" or "hand detection neural network" herein) to detect human hands in two-dimensional color images. That is, a two-dimensional camera may be used to capture color images including human hands holding items. FIG. 1 illustrates an example of a captured two-dimensional image including a human hand holding an item. The color images captured by the two-dimensional camera including human hands holding items (such as the image shown in FIG. 1) may be segmented using manual annotation (i.e., a person may manually identify pixels associated with human hands in each image), to produce images such as the example image shown at FIG. 2, in which the human hand has been segmented from other objects in the image. Accordingly, the initial neural network may be trained to detect human hands using images such as the segmented image shown in FIG. 2. As a note, although the initial neural network is described herein as being trained to detect human hands, similar methods may be used to train an initial neural network to detect any other type of non-target object likely to obscure or otherwise appear in images of target objects to be identified or verified. The trained initial neural network can then be used to detect human hands or other non-target objects in images that are used to train a second neural network (also called a "target object identification neural network" herein) to identify specific target objects.

These neural networks may be configured in a variety of ways. In some examples, the neural networks may deep neural networks and/or convolutional neural networks (CNN), e.g., a Mask R-CNN neural network. In some examples, the neural networks may be distributed and scalable neural networks. The neural networks may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. In examples herein, the neural network is described as having multiple layers, i.e., multiple stacked layers, however any suitable configuration of neural network may be used.

CNNs, for example, are a machine learning type of predictive model that are particularly using for image recognition and classification. In the exemplary embodiments herein, for example, CNNs can operate on 2D or 3D images, where, for example, such images are represented as a matrix of pixel values within the image scan data. As described, the neural network (e.g., the CNNs) can be used to determine one or more classifications for a given image by passing the image through the series of computational operational layers. By training and utilizing theses various layers, the CNN model can determine a probability that an image (or object(s) within an image) or physical image features belongs to a particular class. Trained CNN models can be persisted for restoration and use, and refined by further training. Trained models can reside on any in-premise computer volatile or non-volatile storage mediums such as RAM, flash storage, hard disk or similar storage hosted on cloud servers.

In particular, the second neural network may be trained to identify a specific target object or a specific type of target object. Images of the target object being held by a human hand may be captured by both a two-dimensional camera and a depth-sensing camera (e.g., a three-dimensional camera) simultaneously (or substantially simultaneously, i.e., within less than one second of one another). While the two-dimensional camera captures a typical two-dimensional color image of the target object, the depth-sensing camera captures a "depth image" reflecting the depth (i.e., the distance from the camera) of each captured pixel. For instance, pixels of the depth image associated with objects closer to the camera may be brighter, while pixels of the depth image associated with objects further from the camera may be darker (or vice versa). Consequently, because the target object and the human hand will generally closer to the camera than background objects, the pixels associated with the target object and the human hand will generally be brighter than pixels associated with background objects in the depth image. Accordingly, the edges of the target object and the human hand in the depth image may be automatically detected based on the contrast between the brighter target object (and human hand) and the background of the depth image.

Figure 3:
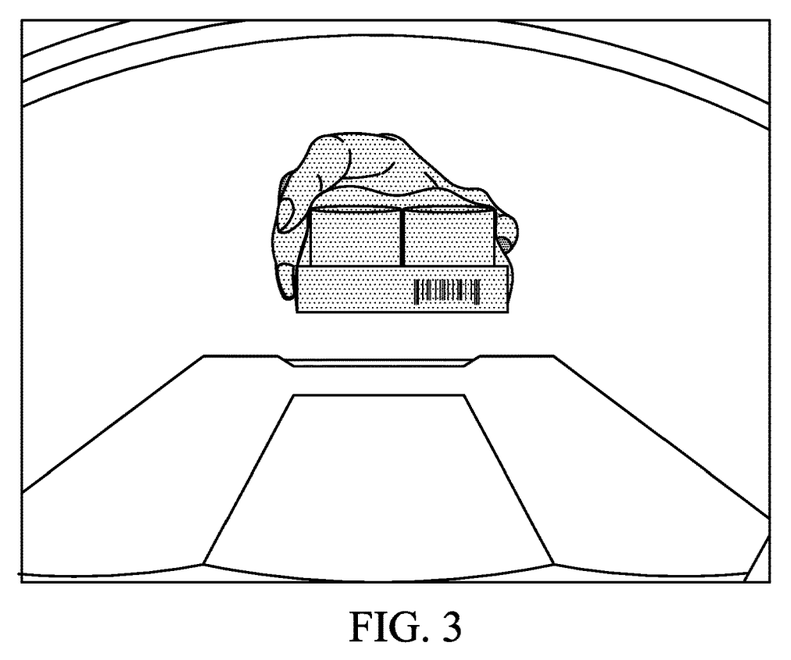
FIG. 3 illustrates an example of a two-dimensional image including a human hand holding an item, in which the item and the human hand together have been segmented from background objects in the image.

The pixels associated the target object and the human hand in the color image captured by the two-dimensional camera may be automatically detected and/or identified using the detected edges of the target object and the human hand from the depth image. In particular, the color image captured by the two-dimensional camera may be analyzed to detect edges of possible objects in the color image, and the detected edges of the target object and the human hand from the depth image may be compared to the detected edges in the color image to detect edges in the color image corresponding to the target object and the human hand. Using these edges, pixels in the color image corresponding to the target object and the human hand may be detected and/or identified. Accordingly, by comparing the image data from the two-dimensional camera and from the depth-sensing camera, the target object and the human hand together may be automatically segmented from background objects in the color image. For instance, FIG. 3 illustrates an example of a two-dimensional image including a human hand holding an item, in which the item and the human hand together have been segmented from background objects in the image.

Figure 4:
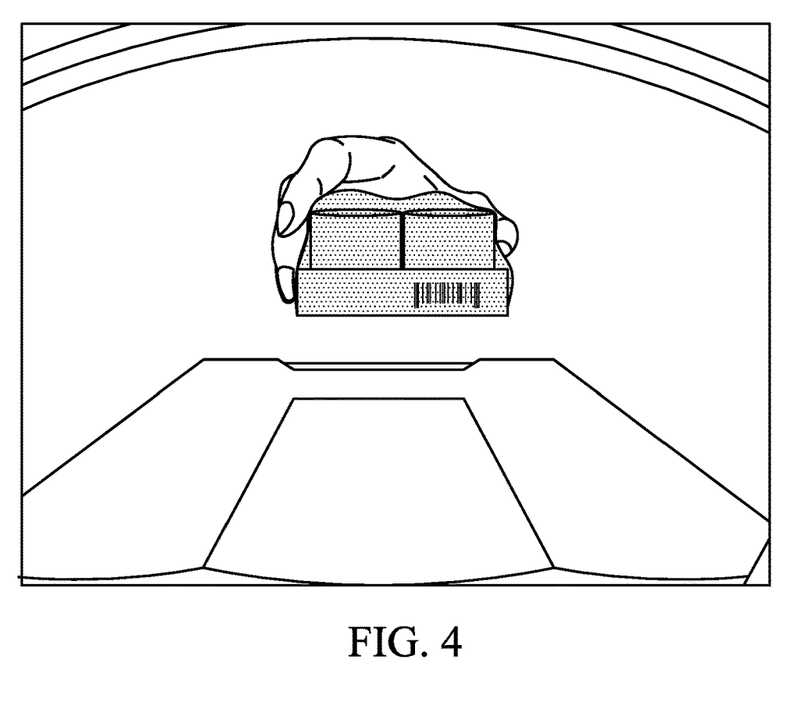
FIG. 4 illustrates an example of a two-dimensional image including a human hand holding an item, in which the item has been segmented from the human hand (and the background) in the image.

The initial (hand detection) neural network may then be applied to the color images containing the automatically-segmented target object and human hand combination (such as the image shown in FIG. 3) to further segment the target object from the human hand. That is, the hand detection neural network may detect any human hands in the color images, and the object recognition system may segment the images by identifying pixels that are part of the automatically-segmented target object and human hand combination but not part of the human hand or hands detected in the color images. For instance, FIG. 4 illustrates an example of a two-dimensional image including a human hand holding an item, in which the item has been segmented from the human hand (and the background) in the image. In some examples, the initial neural network may not detect any human hands in the color images. For instance, the hand may be fully behind an object, or may otherwise hold the object in a way such that the object fully blocks the hand, or such that the object is not obscured by the hand. In these examples, the pixels presumably considered to be part of either the combined target object and human hand may all be part of the target object, with no pixels associated with the human hand, in which case no additional segmenting is required.

The second (target object identification) neural network may then be trained to identify the target object using the color images in which the target object is segmented from any human hands initially in the image (such as the image shown in FIG. 4) as training data. Accordingly, the trained target object identification neural network may be applied to a new image to identify the target object in the new image.

Additional target object identification neural networks may be trained in the same manner as the second neural network described above, to identify additional types of target objects. For instance, in some examples, a first target object identification neural network may be trained to identify pears, while a second target object identification neural network may be trained to identify bananas. Moreover, in some examples, one neural network may be used to identify many classes of objects. Alternatively, separate neural networks can be trained to "verify" different objects. For example, if a scanner scans a barcode that indicates that the barcode is associated with a pear, a neural network can be used to verify that the object is actually a pear. For instance, verification networks can work on one class of object, or many. Verification of multiple classes of objects can also be done via one neural network or via multiple neural networks, in various examples.

In any case, human annotation is only needed for segmentation during the training of the initial (hand detection) neural network, but is not necessary for segmentation during the training of any target object identification neural networks trained to identify hundreds or thousands of different types of items. In particular, the same initial neural network, once trained, may be used in the automatic production of segmented training data used for training of any of the target object identification neural networks.

Figure 5:
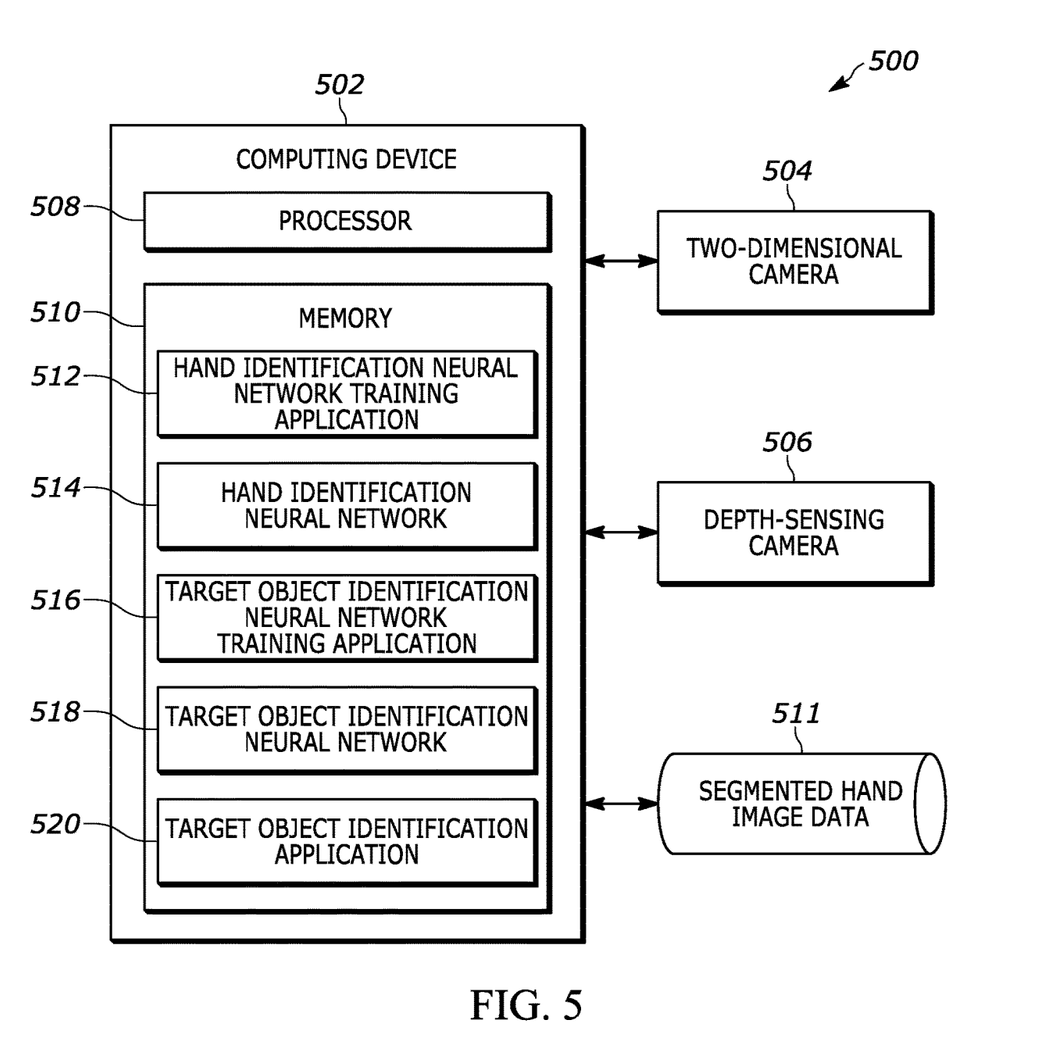
FIG. 5 illustrates a block diagram of an example system including a logic circuit for implementing the example methods and/or operations described herein, including systems and methods for generating images in which a target object is segmented from a human hand holding the target object, to be used in training a neural network to identify a target object being held by a human hand in new images.

FIG. 5 illustrates a block diagram of an example system 500 including a logic circuit for implementing the example methods and/or operations described herein, including systems and methods for generating images in which a target object is segmented from a human hand holding the target object, to be used in training a neural network to identify a target object being held by a human hand in new images. The system 500 may include a computing device 502, as well as at least one two-dimensional camera 504 and at least one depth-sensing camera 506, with both cameras 504, 506 configured to communicate with the computing device 502 (e.g., via a wired connection, or via a wireless network [not shown]). The two-dimensional camera 504 may be configured to capture two-dimensional images and send the two-dimensional images to the computing device 502 for processing. Similarly, the depth-sensing camera 506 may be configured to capture depth images and send the depth images to the computing device 502 for processing. In particular, both the two-dimensional camera 504 and the depth-sensing camera 506 may be configured to capture images of a human hand holding a target object. The two-dimensional camera 504 and the depth-sensing camera 506 may be configured to capture images of the same hand and same target object simultaneously, or substantially simultaneously (e.g., within a short time interval of one another, such as 0.5 seconds, 0.1 second, etc.).

The computing device 502 may include a processor 508, as well as a memory 510. The processor 508, which may be, for example, one or more microprocessors, controllers, and/or any suitable type of processors, may interact with the memory 510 accessible by the one or more processors 508 (e.g., via a memory controller) to obtain, for example, machine-readable instructions stored in the memory 510 In for accessing a segmented hand image database 511, executing a hand detection neural network training application 512 (also called an initial neural network training application or first neural network training application in some examples), executing a trained hand detection neural network 514 (also called a trained initial neural network or trained first neural network in some examples), executing a target object identification neural network training application 516 (also called a second neural network training application in some examples), executing a trained object identification neural network 518 (also called a second neural network in some examples), and/or executing a target object identification application 520, corresponding to, for example, the operations represented by the flowcharts of this disclosure, including those of FIG. 6.

Figure 6:
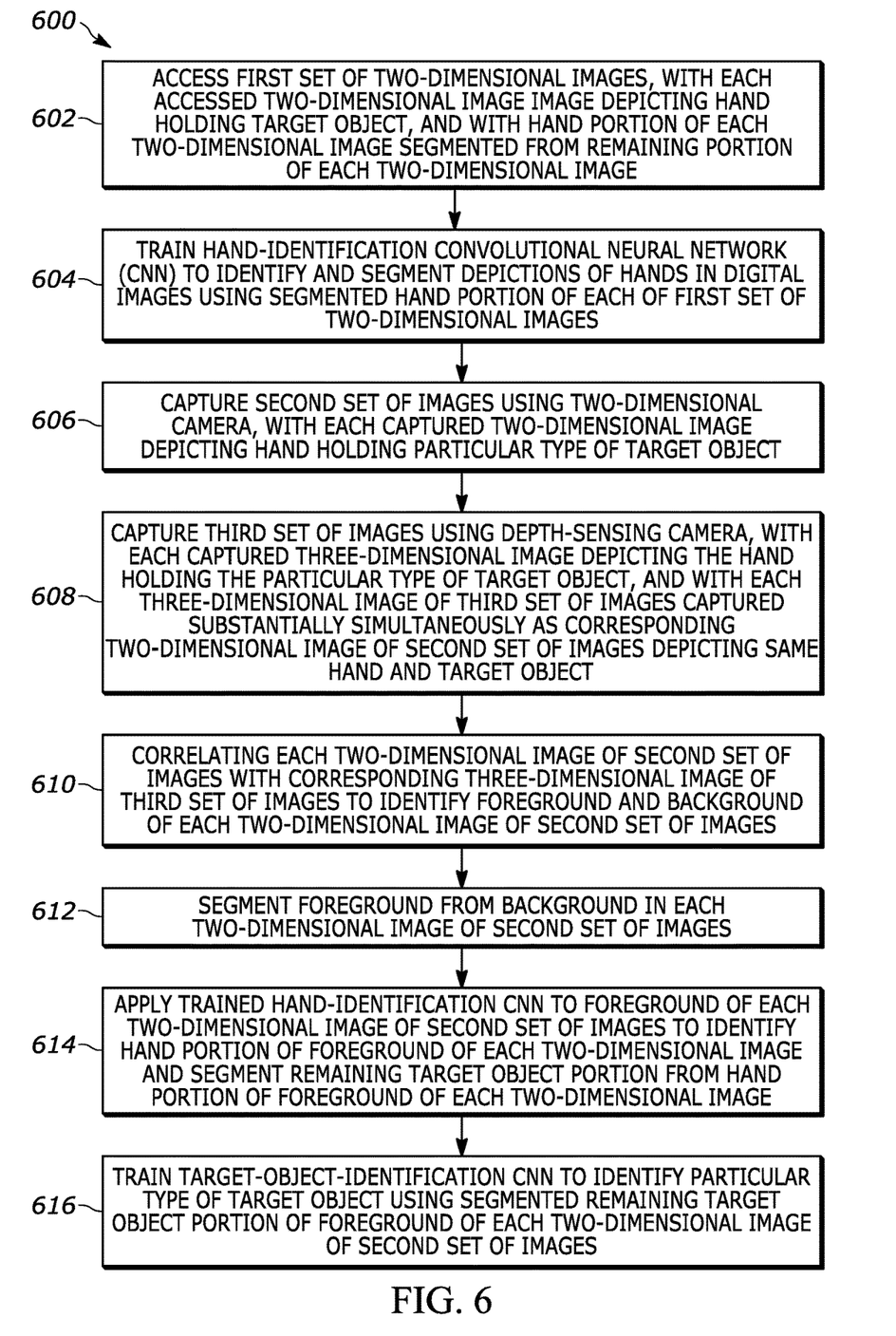
FIG. 6 illustrates a block diagram of an example process as may be implemented by the system of FIG. 5, for implementing example methods and/or operations described herein, including systems and methods for generating images in which a target object is segmented from a human hand holding the target object, to be used in training a neural network to identify a target object being held by a human hand in new images.

FIG. 6 illustrates a block diagram of an example process 600 as may be implemented by the system of FIG. 6, for implementing example methods and/or operations described herein, including systems and methods for generating images in which a target object is segmented from a human hand holding the target object, to be used in training a neural network to identify a target object being held by a human hand in new images.

At block 602, a first set of images may be accessed. Each image of the first set of images may be a two-dimensional image depicting a hand holding a target object. In some examples, the first set of images may be two-dimensional images depicting various hands holding various objects. For instance, one image of the first set of images may be a two-dimensional image depicting a first hand holding an apple, while another image of the first set of images may be a two-dimensional image depicting a second hand holding an orange, and while still another image of the first set of images may be a two-dimensional image depicting a third hand holding a pear.

For each two-dimensional image of the first set of images, a hand portion of the two-dimensional image may be segmented from the remaining portion of the two-dimensional image, with each pixel associated with the hand portion of the image being marked as being associated with the hand portion of the image. For example, the hand portion of each two-dimensional image of the first set of images may be segmented from the remaining portion of the two-dimensional image manually, e.g., by a human manually annotating each image to segment the hand from the remaining portion of the image. The manually annotated images may be stored in a database, such as the segmented hand image database 511 shown in FIG. 5, and accessed by a computing device, such as the computing device 502 shown in FIG. 5, for processing.

At block 604, a hand detection convolutional neural network (CNN) may be trained to detect and segment depictions of hands in digital images using the segmented hand portion of each of the first set of images. That is, the first set of two-dimensional images with the hand portion segmented from the rest of the image may be used as training data for the hand detection CNN, which may analyze the first set of images to determine common features between the various hands depicted in the first set of images. Consequently, once trained, the hand detection CNN may be capable of detecting hands depicted in new two-dimensional images, and may be used to segment hands detected in new two-dimensional images.

At block 606, a two-dimensional camera may capture a second set of images. Each image of the second set of images may be a two-dimensional image depicting a hand holding a particular type of target object. For example, all of the images in the second set of images may be two-dimensional color images depicting various hands holding various apples (e.g., with apples being the particular type of target object). As another example, all of the images in the second set of images may be two-dimensional color images depicting various hands holding various oranges (e.g., with oranges being the particular type of target object).

At block 608, a depth-sensing camera may capture a third set of images. Each image of the third set of images may be a depth image depicting a hand holding the particular type of target object. In particular, each image of the third set of images may correspond to an image of the second set of images, with corresponding images depicting the same hand and the same target object. For example, the second set of images may include a first two-dimensional image of a first hand holding a first apple, as well as a second two-dimensional image of a second hand holding a second apple. The third set of images may include a first depth image of the first hand holding the first apple (corresponding to the first two-dimensional image), as well as a second depth image of the second hand holding the second apple (corresponding to the second two-dimensional image). In particular, each corresponding pair of images from the second and third set may be captured substantially simultaneously (e.g., within one second of one another, within two seconds of one another, etc.), with the two-dimensional camera and the depth-sensing camera facing the target object at slightly offset angles.

At block 610, each two-dimensional image of the second set of images may be correlated with its corresponding depth image of the third set of images to identify a foreground and a background of each two-dimensional image of the second set of images. In particular, each pixel of the depth image may be brighter or darker in accordance with how far away the object the pixel is depicting is from the depth-sensing camera (e.g., portions of the image that depict objects closer to the camera may be brighter while portions of the image that depict objects further from the camera may be darker, or vice versa). For this reason, a high contrast between bright and dark in a depth image can indicate an edge or outline of a foreground object. Accordingly, the edges of foreground objects in the depth image can be automatically detected by analyzing the depth image. Similarly, edges of potential objects in the two-dimensional color image can be detected based on colors in the image. By correlating the detected edges of foreground objects from the depth image to the edges of potential objects from the two-dimensional image, foreground objects can be automatically detected and distinguished from background objects in the two-dimensional color image. Generally speaking, the detected foreground object or objects will include both the target object and the hand holding the target object, because both the target object and the hand holding the target will typically be much closer to the depth camera than any background objects.

At block 612, in each two-dimensional image of the second set of images, the foreground of the two-dimensional image may be segmented from the background of the two-dimensional image. In other words, the pixels associated with the detected foreground object or objects (i.e., the combination of the hand and the target object in the image) may be marked as being associated with the detected foreground object or objects in each two-dimensional image of the second set of images.

At block 614, the hand detection CNN trained at block 604 may be applied to the foreground of each two-dimensional image of the second set of images to detect a hand portion of the foreground of each two-dimensional image. Based on the portion of the foreground of each two-dimensional image that the hand detection CNN detects as the hand, the remaining portion of the foreground may be identified as the target object. Accordingly, the remaining target object portion of the foreground of each two-dimensional image of the second set of images may be segmented, i.e., by marking all pixels associated with the target object (and not the hand) as being associated with the target object.

At block 616, a target object identification CNN may be trained to identify the particular type of target object using the segmented remaining target object portion of the foreground of each two-dimensional image of the second set of images. That is, the two-dimensional images of the second set of images, with target object portions identified and segmented as discussed with respect to block 614, may be used as training data for the target object identification CNN, which may analyze the segmented target object portions of each image to determine common features between the various target objects (e.g., various apples) depicted in the second set of images. Consequently, once trained, the target object identification CNN may be capable of identifying the particular type of target object when it is depicted in new two-dimensional images, even when the particular type of target object is obscured by a hand holding it.

In some examples, the method 600 may further include capturing a subsequent two-dimensional image, and applying the target object identification CNN to the new two-dimensional to determine whether the subsequent two-dimensional image depicts the particular type of target object.

Furthermore, in some examples, the method 600 may further include training another target object CNN to identify another type of target object in a similar manner. For instance, as discussed above, a first CNN may be trained to identify apples in two-dimensional images even when the apples are partially obscured by hands holding the apples in the two-dimensional images. Accordingly, a second CNN may be trained to identify oranges in two-dimensional images even when the oranges are partially obscured by hands holding the oranges in the two-dimensional images, and so on. Advantageously, the same initial hand detection CNN discussed with respect to block 604 may be utilized in generating training data for each subsequent CNN for each type of object. That is, there will generally be no need to train an additional hand detection CNN for each type of object.

Moreover, in some examples, an object verification CNN may be used in place of the target object identification CNN discussed above. The architectures of an object verification CNN is similar to an object identification CNN, but verification can be performed using either a single CNN for all classes or one CNN for each class. For example, an object verification CNN can be used to verify that an item scanned is the same object represented by a barcode associated with the item, or that the item scanned is the same object that a user identified (e.g., via a user interface, keyboard, etc.) For example, if the barcode scan or key-entry specifies a watermelon, a verification CNN may be used to verify whether the object is or is not a watermelon (e.g., rather than identifying that the object is a watermelon, a pumpkin, a turkey, or any other item).

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A computer-implemented method, comprising:

accessing a first set of images, wherein each image of the first set of images is a two-dimensional image depicting a hand holding a target object, and wherein for each two-dimensional image of the first set of images, a hand portion of the two-dimensional image is segmented from the remaining portion of the two-dimensional image;

training a first convolutional neural network (CNN) to identify and segment depictions of hands in digital images using the segmented hand portion of each of the first set of images;

capturing, by a two-dimensional camera, a second set of images, wherein each image of the second set of images is a two-dimensional image depicting a hand holding a particular type of target object;

capturing, by a depth-sensing camera, a third set of images, wherein each image of the third set of images is a depth image depicting a hand holding the particular type of target object, and wherein each depth image of the third set of images is captured substantially simultaneously as a corresponding two-dimensional image of the second set of images depicting the same hand and the same target object;

correlating each two-dimensional image of the second set of images with the corresponding image of the third set of images to identify a foreground and a background of each two-dimensional image of the second set of images;

segmenting, in each two-dimensional image of the second set of images, the foreground of the two-dimensional image from the background of the two-dimensional image;

applying the trained first CNN to the foreground of each two-dimensional image of the second set of images to identify a hand portion of the foreground of each two-dimensional image and segment the remaining target object portion from the hand portion of the foreground of each two-dimensional image; and training a second CNN to identify the particular type of target object using the segmented remaining target object portion of the foreground of each two-dimensional image of the second set of images.

2. The computer-implemented method of claim 1, further comprising:

capturing a subsequent two-dimensional image by a two-dimensional camera; and applying the second CNN to the subsequent two-dimensional image to determine whether the subsequent two-dimensional image depicts the particular type of target object.

3. The computer-implemented method of claim 1, wherein the hand portion of each two-dimensional image of the first set of images is segmented from the remaining portion of the two-dimensional image manually.

4. The computer-implemented method of claim 1, wherein the particular type of target object is a first type of target object, the method further comprising:

capturing, by a two-dimensional camera, a fourth set of images, wherein each image of the fourth set of images is a two-dimensional image depicting a hand holding a second type of target object;

capturing, by a depth-sensing camera, a fifth set of images, wherein each image of the fifth set of images is a depth image depicting a hand holding the second type of target object, and wherein each depth image of the fifth set of images is captured substantially simultaneously as a corresponding two-dimensional image of the fourth set of images depicting the same hand and the same target object;

correlating each two-dimensional image of the fourth set of images with the corresponding image of the fifth set of images to identify a foreground and a background of each two-dimensional image of the fourth set of images;

segmenting, in each two-dimensional image of the fourth set of images, the foreground of the two-dimensional image from the background of the two-dimensional image;

applying the trained first CNN to the foreground of each two-dimensional image of the fourth set of images to identify a hand portion of the foreground of each two-dimensional image and segment the remaining target object portion from the hand portion of the foreground of each two-dimensional image; and training a third CNN to identify the second type of target object using the segmented remaining target object portion of the foreground of each two-dimensional image of the fourth set of images.

5. A system, comprising:

one or more two-dimensional cameras configured to capture a first set of images, wherein each image of the first set of images is a two-dimensional image depicting a hand holding a particular type of target object;

one or more depth-sensing cameras configured to capture a second set images, wherein each image of the second set of images is a depth image depicting the hand holding the particular type of target object, wherein each depth image of the second set of images is captured substantially simultaneously as a corresponding two-dimensional image of the first set images depicting the same hand and the same target object;

one or more processors configured to interface with the two-dimensional camera and the depth-sensing camera; and a non-transitory program memory communicatively coupled to the one or more processors and storing executable instructions that, when executed by the one or more processors, cause the processors to:

correlate each two-dimensional image of the first set of images with the corresponding image of the second set of images to identify a foreground and a background of each two-dimensional image of the second set of images;

segment, in each two-dimensional image of the first set of images, the foreground of the two-dimensional image from the background of the two-dimensional image;

access a third set of images, wherein each image of the first set of images is a two-dimensional image depicting a hand holding a target object, and wherein for each two-dimensional image of the third set of images, a hand portion of the two-dimensional image is segmented from the remaining portion of the two-dimensional image;

train a first convolutional neural network (CNN) to identify and segment depictions of hands in digital images using the segmented hand portion of each of the third set of images;

apply the trained first CNN to the foreground of each two-dimensional image of the first set of images to identify a hand portion of the foreground of each two-dimensional image and segment the remaining target object portion from the hand portion of the foreground of each two-dimensional image; and train a second CNN to identify the particular type of target object using the segmented remaining target object portion of the foreground of each two-dimensional image of the first set of images.

6. The system of claim 5, wherein the one or more two-dimensional cameras are configured to capture a subsequent two-dimensional image, and wherein the executable instructions, when executed by the one or more processors, cause the processors to:

apply the second CNN to the subsequent two-dimensional image to determine whether the two-dimensional image depicts the particular type of target object.

7. The system of claim 5, wherein the hand portion of each two-dimensional image of the third set of images is segmented from the remaining portion of the two-dimensional image manually.

8. The system of claim 5, wherein the particular type of target object is a first type of target object, wherein the one or more two-dimensional cameras are further configured to capture a fourth set of images, wherein each image of the fourth set of images is a two-dimensional image depicting a hand holding a second type of target object; wherein the one or more depth-sensing cameras are further configured to capture a fifth set of images, wherein each image of the fifth set of images is a depth image depicting a hand holding the second type of target object, and wherein each depth image of the fifth set of images is captured substantially simultaneously as a corresponding two-dimensional image of the fourth set of images depicting the same hand and the same target object; and wherein the executable instructions, when executed by the one or more processors, cause the processors to:

correlate each two-dimensional image of the fourth set of images with the corresponding image of the fifth set of images to identify a foreground and a background of each two-dimensional image of the fourth set of images;

segment, in each two-dimensional image of the fourth set of images, the foreground of the two-dimensional image from the background of the two-dimensional image;

apply the trained first CNN to the foreground of each two-dimensional image of the fourth set of images to identify a hand portion of the foreground of each two-dimensional image and segment the remaining target object portion from the hand portion of the foreground of each two-dimensional image; and train a third CNN to identify the particular type of target object using the segmented remaining target object portion of the foreground of each two-dimensional image of the fourth set of images.

* * * * *